INVENTORS.
CORNELIUS C. PERKINS, WILLIAM W. ALLEN JR.,
BRUCE L. AYRES, THOMAS A. DOWDS &
BERNARDO N. LEVY

Sept. 24, 1968   C. C. PERKINS ET AL   3,403,386
FORMAT CONTROL
Filed Jan. 24, 1966   7 Sheets-Sheet 2

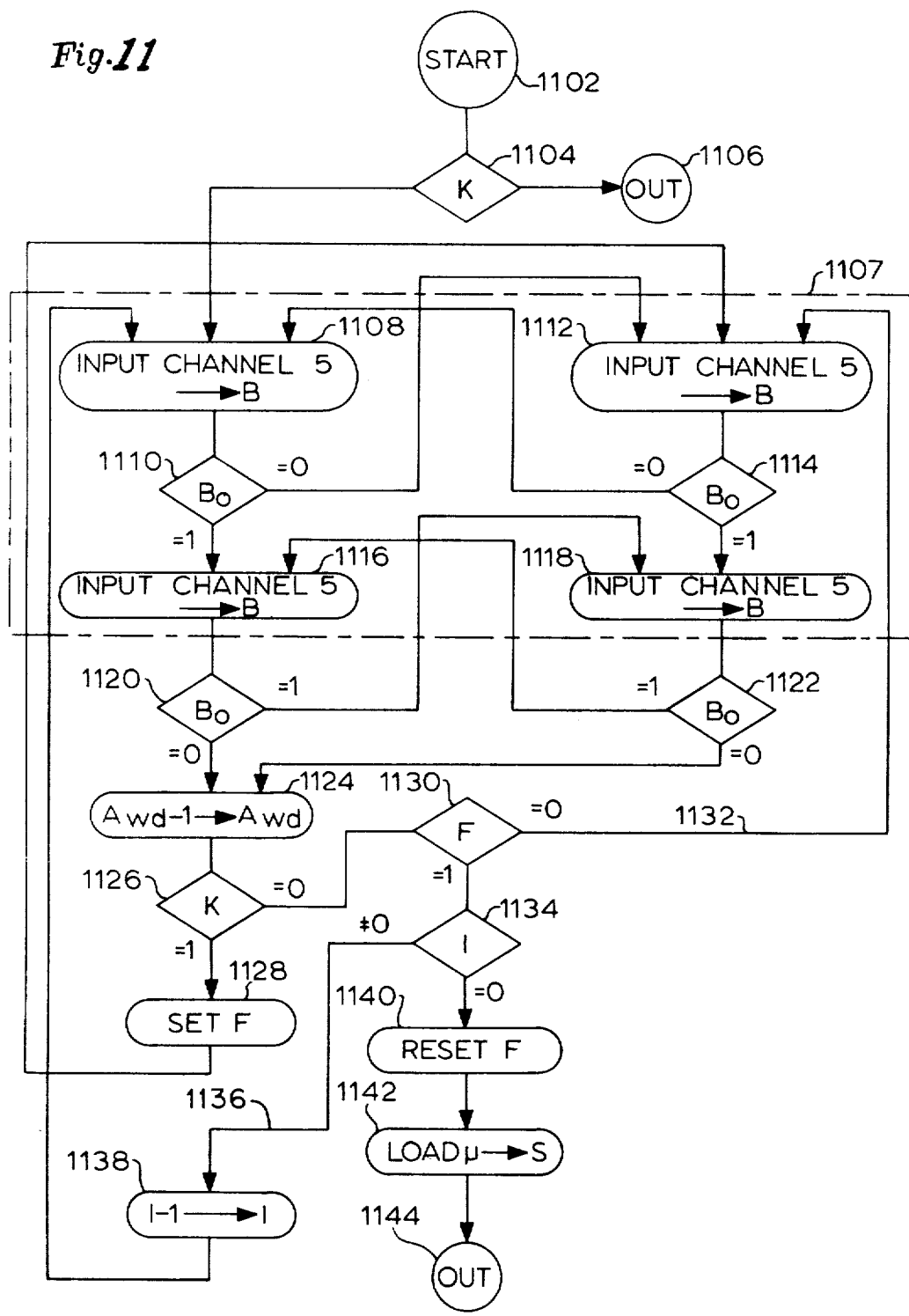

United States Patent Office 3,403,386
Patented Sept. 24, 1968

3,403,386
FORMAT CONTROL
Cornelius C. Perkins and William W. Allen, Jr., Birmingham, Bruce L. Ayres, Detroit, Thomas A. Dowds, Bloomfield Hills, and Bernardo N. Levy, Detroit, Mich., assignors to Burroughs Corporation, Detroit, Mich., a corporation of Michigan
Filed Jan. 24, 1966, Ser. No. 522,440
9 Claims. (Cl. 340—172.5)

ABSTRACT OF THE DISCLOSURE

A format printing control apparatus comprising an addressing circuit which receives information indicating the present position of a printing element and information indicating the next or desired printing position of the printing element. A difference number is determined by subtracting the present position number from the desired position number. The sign of this difference number determines the direction of movement of the printing element. The magnitude of this difference number determines the movement speed of the printing element. Speed control apparatus reduces the speed of the printing element when the element is within a predetermined distance of the desired position. The element is then stopped when the difference number is reduced to zero at the desired position.

---

This invention relates to a method and apparatus for controlling the output devices of computers and business machines, and more particularly, relates to a method and apparatus for automatically or manually controlling the format in which information is recorded on documents by the output device of a computer or a business machine.

Computers and business machines are used to provide documents for billing customers and for various accounting and engineering records. It is desirable that the format of these documents and records be easily changed. For example, it may be desirable to use a format for a customer that is maintaining a charge account that is different from that used for a customer that is paying by check. Also, the nature of problems that are calculated by a customer frequently calls for changes in the format of the output document.

It is desirable to control the output format either directly from the keyboard of the computer or by means of programming. The programming should be easily done and the mechanism for effecting control over the output device should be simple and economical. Accordingly, it is an object of this invention to provide an improved format control for business machines or computers.

It is a further object of this invention to provide a method for controlling the format which utilizes a minimum amount of hardware that is not also employed for more general purposes by the computer.

It is a further object of this invention to provide a format control which is flexible and can be easily changed by the operator.

In accordance with the above objects, an apparatus and a method for positioning the moving element of an output device of a computer from point-to-point under the control of an operator or a program is provided. The location of an item of recorded indicia is frequently controlled by a scanning mechanism that is capable of scanning from point-to-point along a document and of selecting points on the document for recording the items. As the scanning mechanism moves, it generates a signal indicating the distance that it has moved. These signals are used to keep a temporary record of the instantaneous position of the output device as it scans back and forth. An order to move to a new position is entered from the keyboard or from the stored program of the computer. The new position is subtracted from the recorded old position to obtain a signal representing the distance that the output device must move before causing an item to be recorded. The sign resulting from this subtraction indicates the direction that the output device should move. The amount of the difference resulting from the subtraction controls the speed and the direction of motion of the output device.

By this method the scanning mechanism can be moved in any direction at any time in contrast to format control apparatus such as the one disclosed in the U.S. patent to Hoberg et al., Patent No. 2,918,658. Such prior art format control apparatus only permits the output device to move between a few predetermined locations under the control of the computer. These locations are mechanically selected by moving one of several detents positioned along the path of the scanning mechanism into the path of the scanning mechanism at the selected location. Such prior art output devices cannot be moved from any point to any other point.

Furthermore, the apparatus of this invention uses software to perform many functions heretofore performed by hardware. This reduces the cost of the format control and at the same time increases its flexibility. The signals generated by the output device as it moves back and forth may be recorded in the memory of the computer in the form of a software counter. Each signal can be added to the prior signals in the computer's adder and stored at some permanent location in the memory. This number can be subtracted from a number representing the position to which the output device is to be moved in the arithmetic unit of the computer. The difference obtained by this subtraction process can control the speed, the direction, and the stopping of the output device scanner. The operations can be controlled by a microprogram stored in the computer to determine the format.

The invention and the above noted and other features thereof will be understood more fully and completely from the following detailed description when considered with reference to the accompanying drawings in which.

Figure 6:
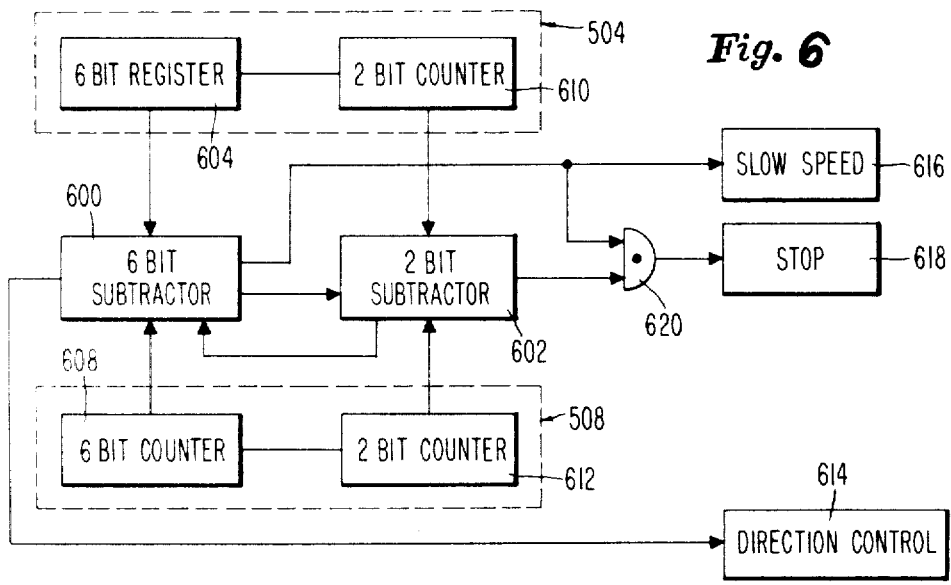
Figure 8:
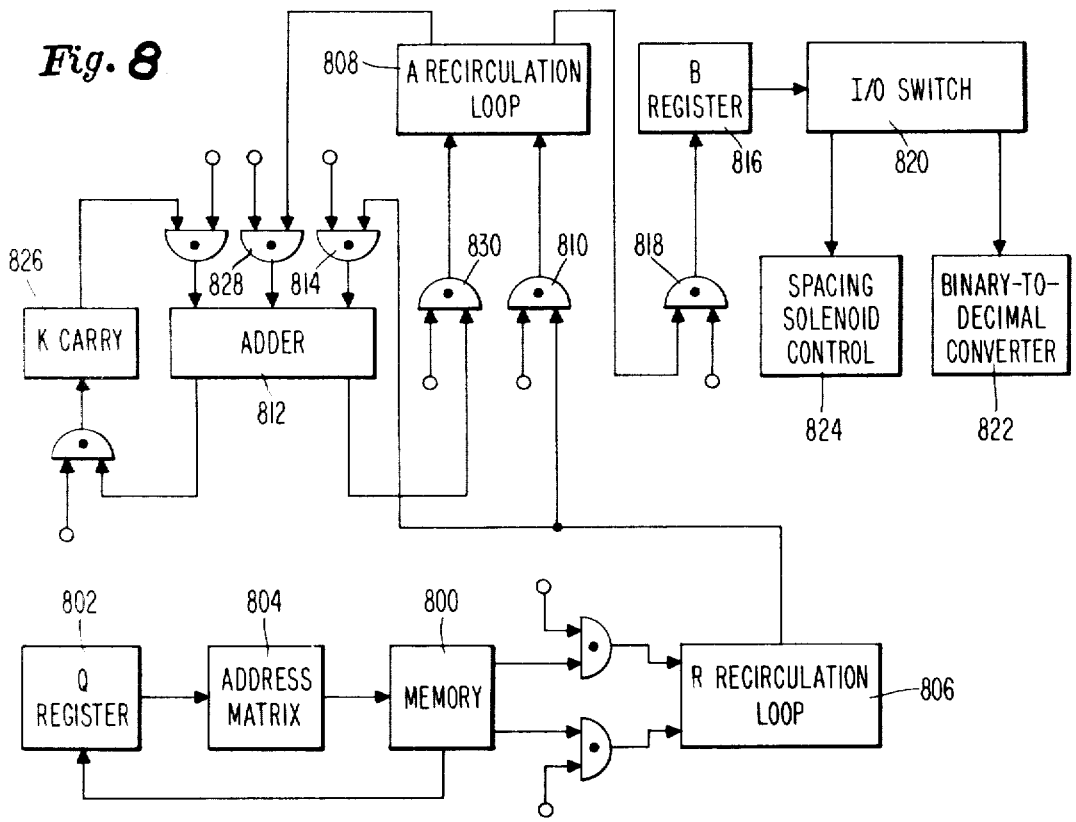
Figure 7:
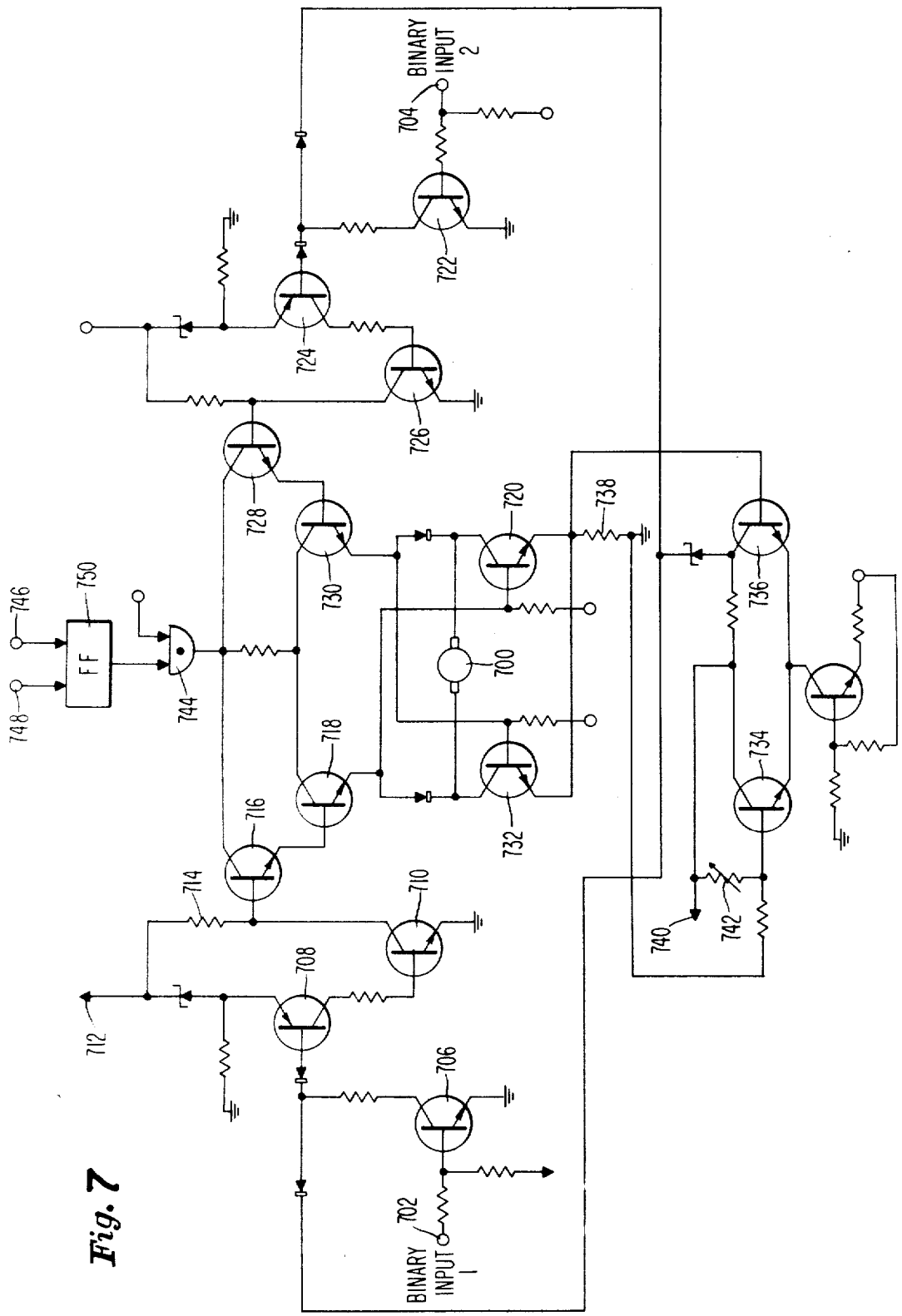
Figure 9:
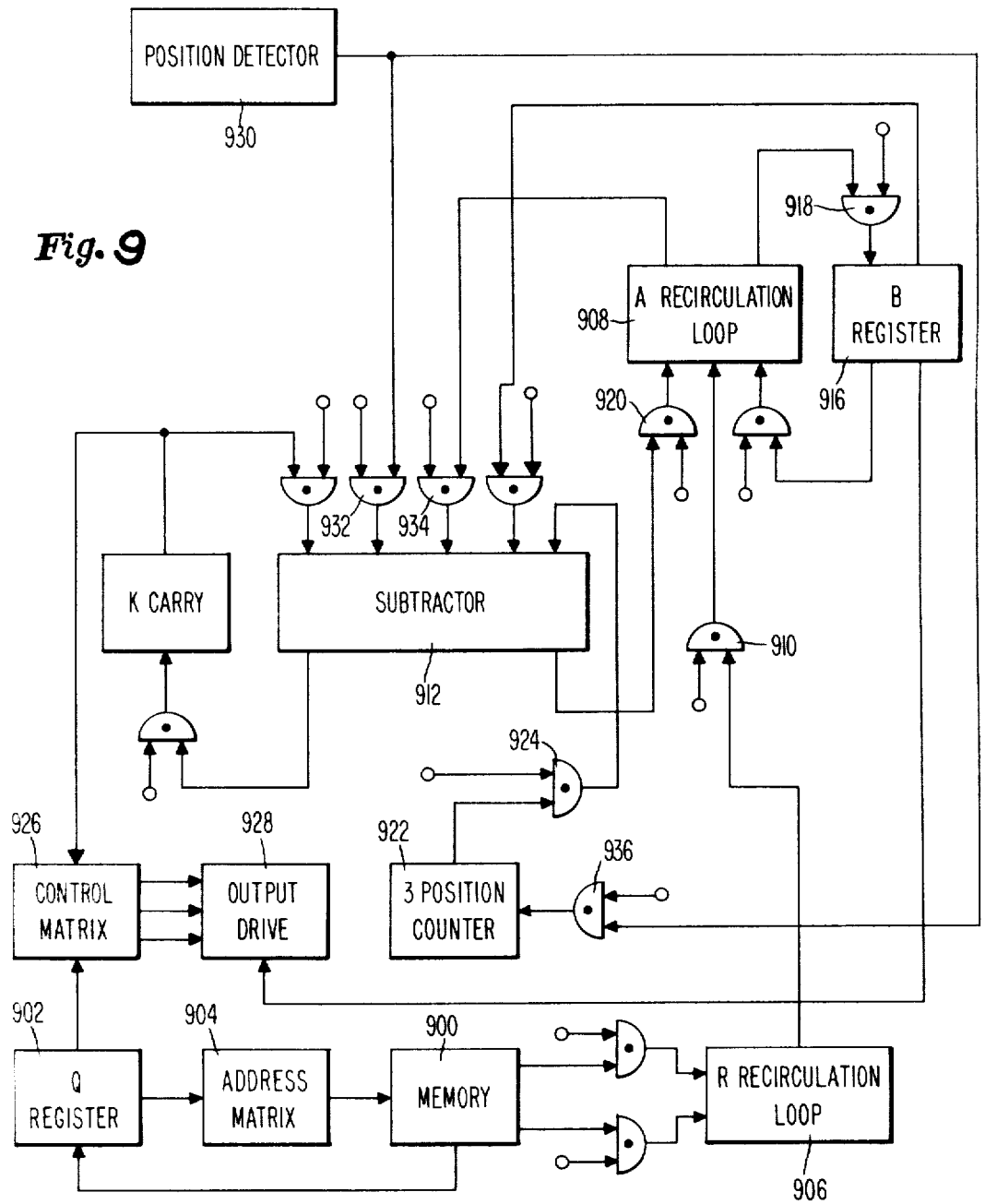
Figure 10:
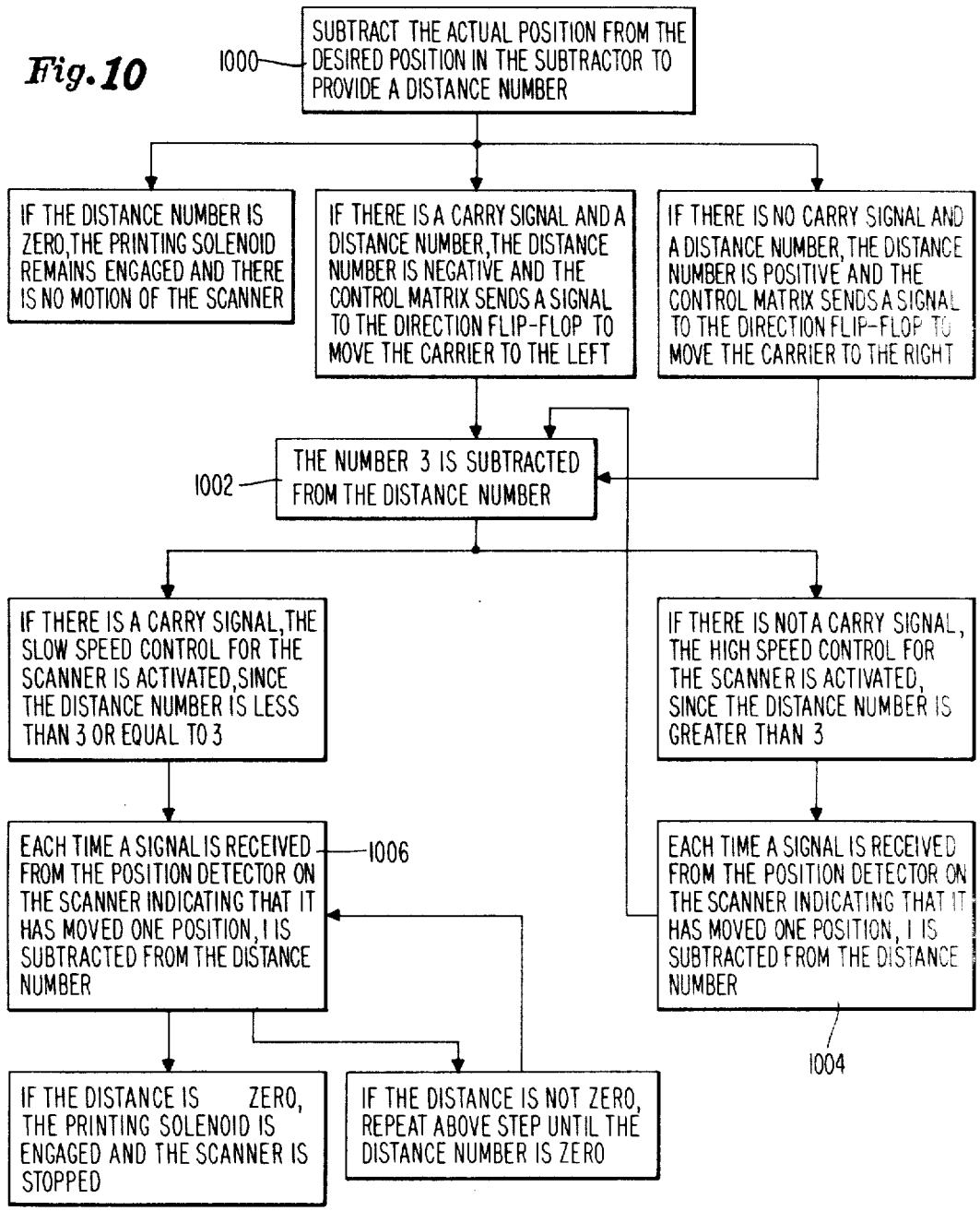

FIG. 6 in a block diagram illustrating a manner of determining the speed control and the stop control signals in an embodiment of the invention;

FIG. 7 is a schematic circuit diagram of the direction and speed control for the output scanner;

FIG. 8 is a block diagram illustrating the operation of the invention in controlling the output device when it provides for recording at successive locations on the recording medium;

FIG. 9 is a block diagram illustrating the manner in which a tab, carriage return, or any other change of position is made without printing;

FIG. 10 is a flow diagram illustrating the steps that the processor of the computer follows in order to control the format of the output device using software in place of conventional hardware units;

FIG. 11 is a flow diagram of a software counter used in an embodiment of the invention.

Figure 1:
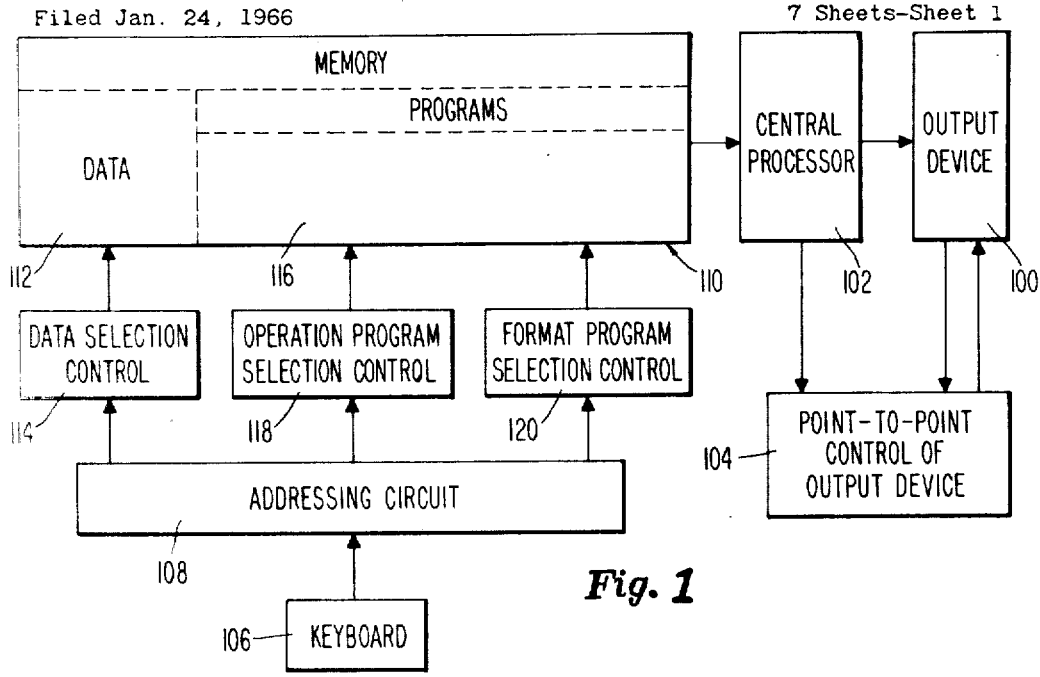
FIG. 1 is a block diagram illustrating the use of the format control of the invention with a keyboard driven computer.

In FIG. 1, a block diagram is shown illustrating an output device 100 under the control of a central processor 102 and a point-to-point control mechanism 104. The point-to-point control mechanism controls the output device in accordance with information received from the output device 100 and from the central processor 102. A keyboard 106 is provided for manually supplying information to an addressing circuit 108 which has access to a memory 110. The addressing circuit 108 may cause data to be read out of the memory into the central processor 102 from a data section 112 of the memory 110 under the control of a data selection control 114. Operators and format information are also read out of the memory 110 from another section 116 of the memory under the control of the operation program selection control 118 and the format program selection control 120 respectively. These controls are actually microprograms in the preferred embodiment, but could be hardware circuits.

The memory 110 may be of any suitable type, such as a magnetic core matrix or magnetic disks. The addressing circuits 108 may be any suitable selection matrix such as that disclosed in the United States patent to Auerbach, Patent No. 2,844,812. If a magnetic memory is used, the addressing and selection circuits may utilize a magnetic reading head selection matrix such as that described in the United States patent to Hoberg, Patent No. 2,932,008. Several different types of output devices and central processors may be used in this invention, including those described in the patent to Hoberg, Patent No. 3,053,449. This last mentioned patent to Hoberg also discloses selection circuitry and arithmetic circuitry that may be used in this invention. However, the computer described in the aforementioned Hoberg patent uses a format control system that requires elaborate programming through the central processor and through an external plugboard. The format control stops the typewriter carriage device at predetermined locations under the control of relay stopping devices located at fixed points with respect to the platen of the printer.

Figure 2:
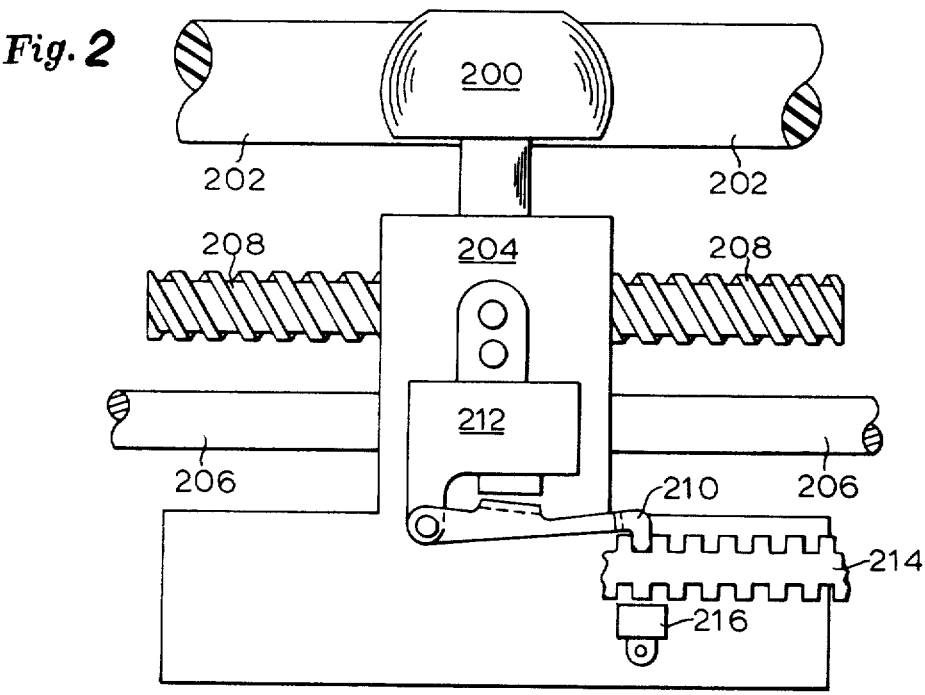
FIG. 2 is a diagrammatic sketch of a single element printer that may be used as the output device in an embodiment of the invention.

Since the format control of this invention, in contrast to the format control of the Hoberg patent, uses point-to-point positioning, a transducer is used for detecting the motion of a scanning mechanism that locates the positions for recording. In FIG. 2, a single element printer is shown that illustrates the use of such a transducer. In the serial printer of FIG. 2, a printing element 200 is moved with respect to a platen 202 upon which documents are placed. The single type printing element 200 is impacted against the documents on the platen 202 to print at selected locations.

The printing element 200 is mounted on a scanning mechanism (carrier) 204 which slides along a carrier holder 206 under the control of a driving screw 208. A pawl 210 is mounted on the carrier 204 and controlled with respect to its position by a solenoid 212. The solenoid 212 holds the pawl 210 in an upward position whenever the carrier 204 is moving to position the printing element 200 with respect to the platen 202. When the carrier is to be stopped, the solenoid 212 releases the pawl 210 so that it engages with a rack 214 that is rigidly fixed in position with respect to the platen 202. When the pawl 210 engages the rack 214, the printing element 200 is located in an appropriate position for printing. The screw 208 which moves the carrier from position to position also biases the carrier when the pawl 210 is engaged so that if the pawl 210 is lifted the carrier immediately moves one space, at which time the pawl is dropped into the next detent of the rack 214.

A detecting transducer 216 is mounted on the carrier 204 and detects its position with respect to the rack 214. This detector 216 includes a transducer which supplies a pulse to the computer each time the carrier 204 moves one position with respect to the rack 214. These pulses are used to record the position of the carrier 204 so that the computer may determine the number of positions and the direction that the printing element 200 is to be moved before it prints in accordance with some planned format.

Figure 3:
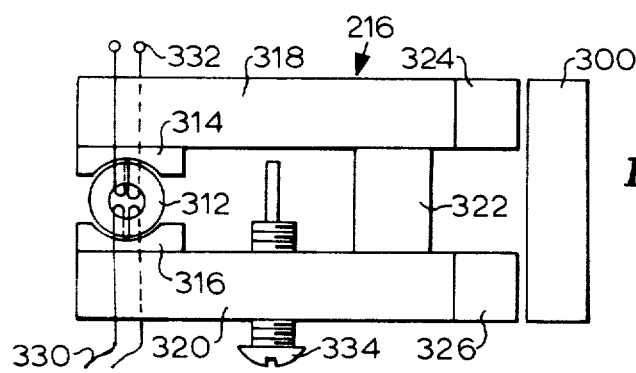
FIG. 3 is a diagrammatic sketch of a transducer which may be used to provide signals as the output device is moved from position to position.

In FIG. 3 a transducer is shown, which transducer is suitable for generating the signals indicating the position of the carrier in the output device. A plurality of high permeability shunts 300 are mounted on the bottom side of the rack 214 (FIG. 2) in a spaced apart relationship so that there is one such shunt for each position of the carrier with respect to the platen.

The transducer 216 which is mounted on the carrier includes a ferromagnetic core 312 mounted between two pole pieces 314 and 316. Each of these pole pieces are formed so as to fit around the ferromagnetic core 312 and also to fit against a different one of two high permeability flux distributors 318 and 320. A permanent magnet 322 is placed between the two flux distributors 318 and 320 in such a way that one of the poles of the permanent magnet 322 is in contact with one of the flux distributors and the other pole of the permanent magnet is in contact with the other flux distributor.

It can be seen that a closed flux path is formed from one pole of the permanent magnet, through one of the flux distributors, through the ferromagnetic core, through the other flux distributor, and back to the other pole of the permanent magnet. A pole piece 324 is attached to the flux distributor 318 so as to be adjacent to the path of the shunt 300 as the carrier moves past the rack 214 (FIG. 2) and another pole piece 326 is connected to the flux distributor 320 and aligned with the pole piece 324 so that the shunt 300 formed a closed flux path with the permanent magnet 322 and the flux distributors 318 and 320 as it passes next to the two pole pieces 324 and 326.

When the shunt 300 is positioned away from the pole pieces 324 and 326, the ferromagnetic core 312 receives all of the flux from the permanent magnet 322 and cannot be switched from one state to the other. When the shunt 300 is moved to form a second flux path, much of the flux from the permanent magnet 322 is diverted away from the ferromagnetic core 312 to permit this core to be switched from one state to the other by a current supplied through a driving winding 330.

Whenever the core is switched from one state to the other, an output voltage is induced in the output winding 332. An adjusting screw 334 is threaded through the flux distributor 320 in the direction of the flux distributor 318 to provide a high permeability alternate flux path which can be adjusted by changing the gap between the screw 334 and the flux distributor 318 to control the amount of flux that passes through the core 312. In this way the inhibiting flux for the core 312 can be adjusted so that the core is not switched by the current from a clock pulse source when the shunt 300 is positioned away from the pole pieces 324 and 326 and so that the core is switched by pulses from the clock pulse source when the shunt 300 is adjacent to both of the pole pieces 324 and 326.

It can be seen that if a plurality of the shunts 300 are connected to the bottom side of the rack 214 (FIG. 2) and if the transducer 216 (FIG. 2) is affixed to the carrier adjacent to the shunts, an output signal is provided on line 332 in response to clock pulses whenever the carrier is moved from one printing position to the other with respect to the rack 214. In the alternative, one or more of the shunts 300 may be attached to the screw 208 (FIG. 2) and formed so as to rotate with the screw 208 and the transducer may be placed adjacent to the screw so that whenever the screw turns a sufficient amount to move the carrier one printing position, the shunt releases the ferromagnetic core in the transducer causing it to provide output pulses to a computer. Fewer shunts are required in this embodiment. The transducer described above is described more fully in the United States patent application to Flavius A. Mathamel, Ser. No. 433,359, filed Feb. 17, 1965, and assigned to the same assignee as this application.

Figure 4:
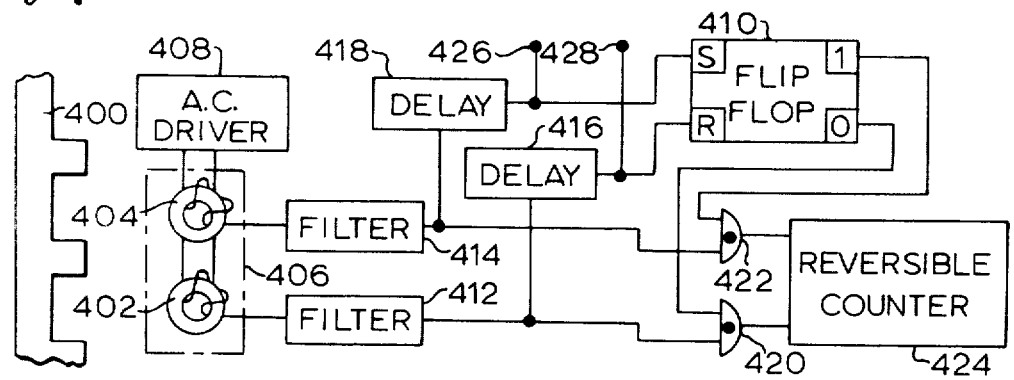
FIG. 4 is a block diagram illustrating the manner in which the position of the output device may be recorded.

In FIG. 4 another position detector is shown connected to provide pulses to a counter for maintaining a count indicating the position of the carrier with respect to a reference point on the platen at any time. In FIG. 4, a plurality of shunts 400 are shown, which shunts may be connected to the bottom side of the rack 214 (FIG. 2). The distance between shunts is equal to one printing position of the carrier 204 (FIG. 2). Two cores 402 and 404 are connected to the carrier and spaced apart a distance less than that of the distance between the shunts. These cores are biased by a permanent magnet 406. An AC driver 408 provides driving pulses to both cores which, in turn, each provides an output pulse when one of the shunts passes adjacent to it so that each core produces one output pulse at a different time each time the carrier moves one printing position.

These pulses are applied to different inputs of a flip-flop 410 after being passed through a different one of the filters 412 and 414 and a different one of the delay lines 416 and 418. The outputs from the filters 412 and 414 are each connected to one input of a different one of the AND gates 420 and 422 and different outputs of the flip-flop 410 are connected to the other input of a different one of the two AND gates 420 and 422. The outputs of the AND gates 420 and 422 are each connected to the opposite terminals of a reversible counter 424.

As the carrier moves, a shunt passes one of the cores causing it to generate an output pulse which is passed through one of the AND gates, which AND gate is held open by an output of the flip-flop 410. Later a pulse is provided by the other core, but this pulse is applied to the AND gate which is closed because the flip-flop 410 is providing an output only to the first AND gate. The pulses from the first and second cores are also passed in that order to the flip-flop 410 causing it to change states twice, leaving it in its original state. Because of the delays 416 and 418, this change takes place after a pulse has been applied to the reversible counter 424 to count one printing position.

When the carrier changes directions of motion, a pulse is applied to one of the two direction input terminals 426 or 428 to change the setting of the flip-flop 410. Now the process of counting is exactly reversed so that one pulse is applied to the reversible counter each time the carrier moves one position, but to the opposite input terminal causing the counter to count in the opposite direction. It can be seen that regardless of the direction of motion of the carrier, the counter 424 keeps a record of the position of the carrier with respect to the platen. The position detector and the technique for recording the outputs from the position detector are described more completely in the application to Shukla et al., Ser. No. 667,001. It is possible to dispense with one of the ferromagnetic cores and with the hardware counter by using software, as will be explained hereinafter.

Figure 5:
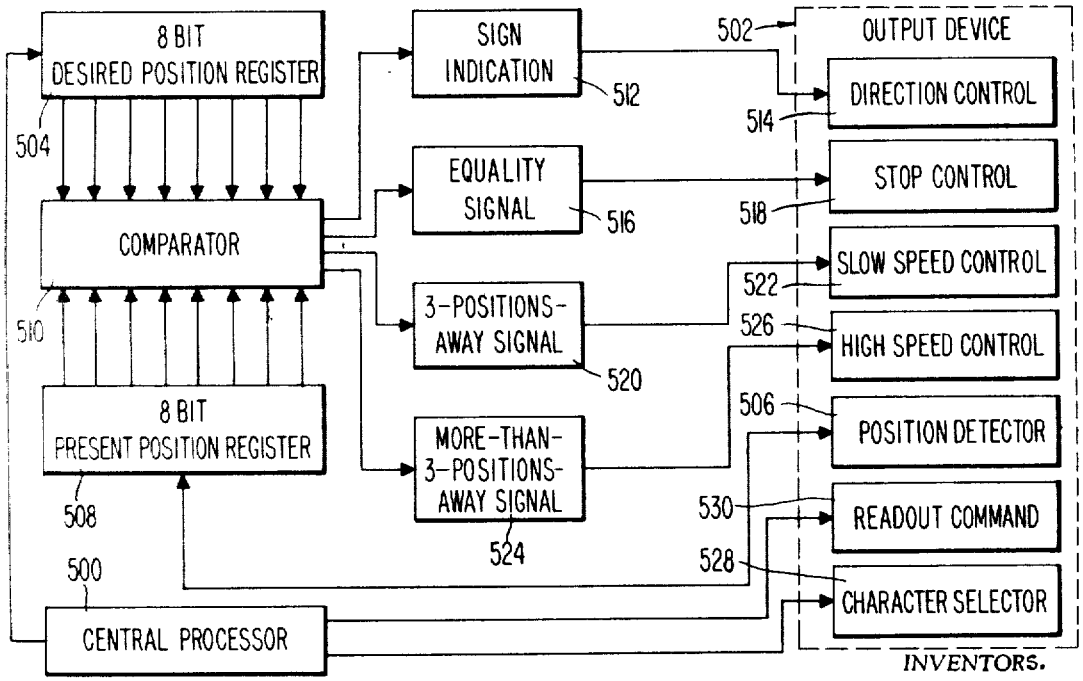
FIG. 5 is a block diagram illustrating an embodiment of the invention.

In FIG. 5 a block diagram is shown illustrating an embodiment of the invention in which a central processor 500 controls an output device 502 from point-to-point under the control of a stored program. The central processor 500 applies a number to an 8 bit desired-position register 504, which number indicates the new position to which the carrier is to go. A position detector 506, as described above, supplies a count to the 8 bit present-position counter 508 as the output device 502 moved from printing position to printing position. The 8 bit present-position counter 508 maintains a count that indicates the instantaneous position of the carrier in the output device.

A comparator 510 receives the count from the desired-position register 504 and compares it with the count in the present position counter 508. The output from the comparator is applied to the four control units of the output device 502. The sign indication output 512 provides a signal to the direction control 514 depending on whether the present-position counter or the desired-position register is larger. An equality signal 516 activates the stop control 518 to release the pawl 210 (FIG. 2) to stop the carrier whenever the count in the present-position register 508 equals the count in the desired-position register 504. The three-positions-away signal 520 activates the slow speed control 522 whenever the desired-position register contains a count that is exactly three positions larger than the count in the present-position register 508. The more-than-three positions away signal 524 activates the high speed control 526 whenever the count in the desired-position register is more than three positions greater than the count in the present-position register.

The central processor 500 also provides a signal to the character selector 528 to determine the next character that is to be printed. The character selection mechanism is described in greater detail in the patent to Caspari, Patent No. 3,250,464, entitled Binary to Decimal Converter and assigned to the same assignee as this application. That patent describes the manner in which a binary electrical signal is used to position a printing head such as 200 (FIG. 2) to a desired character prior to impacting the printing element against a document on the platen. The central processor 500 also provides a signal to the readout command unit 530 which causes a print head to be moved against the platen.

The comparator 510 and the counters 504 and 508 may be of several different types known in the art. The aforementioned application to Shukla et al., provides one example of a suitable counter. Instead of a hardware counter such as that described in the application to Shukla et al., a software counter may be used. Also, the comparator 510 may be either a hardware comparator or a software comparator. In FIG. 6 a block diagram is shown describing a particularly useful comparator for the application of this invention.

In FIG. 6 a 6 bit subtractor 600 and a 2 bit subtractor 602 are the main components of the comparator. The counters 504 and 508 (FIG. 5) comprise series connected 6 bit counters and 2 bit counters. The outputs from the 6 bit counter 604 and the 6 bit counter 608 are connected to a 6 bit subtractor 600 and the outputs from the 2 bit counter 610 and the 2 bit counter 612 are connected to the 2 bit subtractor 602. The subtractors 600 and 602 may be of the type described in the patent to Hoberg, Patent No. 3,053,449, entitled Electronic Computer System. This subtractor as shown in FIG. 27 is an adder which performs subtraction by adding the complement of the subtrahend.

If the subtrahend is larger than the minuend, then the direction control 614 receives a signal directing the carrier to move to the right; if the minuend is larger than the subtrahend, the direction control 614 receives a signal from the 6 bit subtractor 600 directing the carrier to move to the left. These signals originate in the carry signal outputs of the subtractor. When the 6 bit subtractor 600 indicates that the subtrahend in 608 is equal to the minuend stored in register 604, it provides an output signal to the slow speed control 616. This occurs whenever the carrier is three positions away from its final destination since the count is maintained in binary notation. When the 2 bit subtractor 602 indicates that the subtrahend in the 2 bit counter 612 is equal to the minuend in the 2 bit counter 610, a signal is sent to the stop control 618 through the AND gate 620. The AND gate 620 provides an output only when both the 6 bit subtractor 600 and the 2 bit subtractor 602 indicate an equality between the desired position and the instantaneous position of the carrier.

The carrier is driven by a DC printed circuit motor such as that described in the aforementioned application to Shukla et al. In FIG. 7 a schematic circuit diagram of a motor control circuit for sending current through the armature 700 of the motor in one direction when a binary one is applied to input terminal 702 and for sending current in the opposite direction when a binary one input is applied to terminal 704 is shown. The signals applied to the terminals 702 and 704 are supplied by the two outputs of a flip-flop so that only one signal may be applied at a time. The flip-flop is controlled by the output from the sign determining circuit of the subtractor.

A positive input signal to terminal 702 is amplified by the NPN transistor 706 which, in turn, drives the transistors 708 and 710 further into conduction. The transistor 710 inverts the positive voltage from the source 712 causing the transistor 716 to be less conductive. This, in turn, reduces the current of the transistors 718 and 720 so that current cannot flow from left to right in the armature 700. At the same time, the binary zero input at terminal 704 reduces the conductivity of transistor 722 which, in turn, reduces the conductivity of the transistors 724 and 726. The transistor 726 inverts the low amplitude binary zero signal, driving the transistor 728 further into conduction. The transistors 730 and 732 are, in turn, driven further into conduction causing the current to go from right to left in the armature 700 of the motor. It can be seen that if a binary one is applied to terminal 704 and the binary zero to terminal 702, all of the transistors mentioned above are switched to their opposite state of conduction and current flows through the armature 700 from left to right causing the motor to drive the carrier in the opposite direction.

The transistors 734 and 736 form a differential amplifier having its inputs on opposite sides of the resistor 738 which receives some of the output current flowing through the armature 700. The resistor 738 is chosen so that when 8 amperes of current flow through the armature 700, the voltage drop applied to the differential amplifier from the opposite ends of the resistor 738 are neutralized by the voltage from the source 740 which is dropped across the potentiometer 742. When less than 8 amperes flow through the armature 700, the voltage across the resistor 738 is reduced, causing the current through the transistor 736 to be reduced. This causes the voltage on the collector of the transistor 736 to increase, which causes the voltage fed back to the input circuits of the motor control unit to increase. This, in turn, decreases the current through either the transistor 708 or the transistor 724 depending on the direction of the motor. This decrease in current results in reduced current through two of the transistors forming the motor control bridge and including the four transistors 718, 720, 730 and 732 to compensate for the previous increase. The reverse action takes place when the current falls below 8 amperes in the armature 700. In this way the current is maintained constant.

The slow speed, fast speed, and stop control is obtained by a tachometer which measures the speed of rotation of the motor and controls a power switch or AND gate 744 in the power supply of the motor control circuit. The switch 744 disconnects the power from the motor control circuit whenever the speed of the motor exceeds its selected value or whenever the motor is to be stopped.

The high and low speeds are controlled by an oscillator which is capable of generating pulses at two different frequencies, a low frequency for slow speed and a high frequency for fast speed. A photocell picks up like pulses as the motor rotates in proportion to the speed of the motor. The frequency of these pulses is compared with the frequency provided by the oscillator. The frequency of the oscillator is selected by a flip-flop switch. If the frequency of the pulses obtained from the rotation of the motor exceeds the frequency of the pulses provided by the oscillator, the switch 744 is opened so as to disconnect power from the motor, causing it to slow down to its rated speed. This type of speed control is described in greater detail in the patent to Houldin et al., United States Patent No. 3,154,730. The two inputs to the motor driver 15 in the patent to Houldin et al. are applied to the two inputs 746 and 748 of the flip-flop 750 in FIG. 7 of this invention.

In FIG. 8 a block diagram is shown of the equipment used to control the carrier when it is stopping at each position in succession. For example, if a single element printer is used, the block diagram of FIG. 8 shows the equipment that would keep track of the position of the printing element as it prints the successive letters of a word.

The program controlling the format of the printing and the information which is to be printed out are stored in a memory 800 into which all keyboard data is first read prior to printing. A sequence of instructions is read from the memory 800 to a Q register 802, which register is the instruction register in this embodiment of the invention. The microprograms for controlling the format are sequenced through this register. The instruction stored in the Q register is decoded by an address matrix 804 to select further information from the memory and to control other necessary operations during printing.

The information identifying a character to be printed out is read out of the memory 800 into the R recirculation loop 806, which recirculation loop may be of the type described in the aforementioned patent to Hoberg et al., Patent No. 3,053,449. The R recirculation loop passes information to the A recirculation loop 808 through the AND gate 810, which is controlled by the Q register 802. It may also supply information directly to the adder 812 through the AND gate 814.

A character that is to be printed out is read first from the R recirculation loop 806, then to the A recirculation loop 808, and from there into the B register 816 under the control of the AND gate 818. Character designations may also be obtained from the keyboard or may result from a calculation. A print command from the Q register 802 to the I/O (input-output switch) 820 causes the information stored in the B register 816 to be applied to the binary-to-decimal converter 822 to select the character on the single element printer prior to impacting it against a document. The instruction in the Q register 802 also sends a command to the spacing solenoid control 824 to move the carrier one position each time a character is printed.

A number representing the present position of the carrier from a reference point on the platen is recorded in the A recirculation loop 808. If the carrier were being moved several positions without printing, the final destination of the carrier would be recorded in the B register 816. However, since the B register 816 must contain the information indicating the character that is to be printed whenever the printing element is printing characters in succession, it is not available to store the position of the final destination of the carrier. Because of this, the instruction in the Q register 802 automatically increments the position number stored in the A recirculation loop by one each time the carrier prints and moves to the next position. To accomplish this, the Q register 802 sets the K carry register 826 and then causes the position number to be read from the A recirculation loop 808 into the adder 812 by pulsing the AND gate 828 at the proper time. The position number is then passed through the serial adder 812 and is incremented by the carry signal in the K carry register 826. The position number is then read back into the A recirculation loop 808 by pulsing the AND gate 830.

In summary then, whenever the printer is printing a number of characters in succession, a series of instructions identifying the character and having a control code for successive printing is read from the memory 800 into the Q register 802. The Q register 802 causes the proper character to be read from the memory 800, to the R recirculation loop 806, to the A recirculation loop 808, and into the B register 816. It also sends an order to the B register 816 and to the I/O switch 820, causing the single element printing head to be positioned to the proper letter or number. It also sends a signal to the impact control ordering the printing element to be impacted against the document. Next, the instruction in the Q register 802 releases the spacing solenoid control 824 causing the carrier to move one position to the right. It also sets the K carry 826 and causes the position number of the carrier to be read from the A recirculation loop through the adder 812, which increments it by one, and then sends it back into the A recirculation loop 808.

In FIG. 9 a block diagram is shown of the circuit elements that are used when the carrier moves several positions without printing as, for example, in a tab or carriage return operation of the printing element.

In this case, an instruction is read from the memory 900 into the Q register 902. This instruction contains signals indicating that a long motion of the carrier is to be performed and also contains the address in the memory 900 of the desired-position number indicating the location to which the carrier is to be moved. The portion of the Q register containing the address of the desired-position number in the memory 900 is applied to the address matrix 904, which causes this number to be read into the R recirculation loop 906. The instruction stored in the Q register 902 then causes the desired-position number to be read into the A recirculation loop 908 by pulsing the AND gate 910. The present-position number of the carrier, which is normally stored in the A recirculation loop 908 and which indicates the instantaneous position of the carrier is read into the B register 916 by pulsing the AND gate 918.

The desired-position number is then read from the A recirculation loop 908 into one input of a subtractor 912 and at the same time the present-position number is read from the B register 916 into the other input of the subtractor 912 so that the present-position number of the carrier is subtracted from the desired-position number of the carrier to provide a distance number indicating the direction and the distance that the carrier must be moved. This number is stored in a working register. If a carry signal results from this subtraction, the present-position number is less than the desired-position number, and a signal is sent to the direction control of the carrier indicating that it should be moved to the right. If no carry signal results, the direction control of the carrier holder is signaled to move it to the left.

The distance number is then read into the A recirculation loop 908 through the AND gate 920. The output from a 3 position counter 922 is read into the subtractor 912 through the AND gate 924 at the same time that the difference number is read back from the A recirculation loop 908 into the subtractor 912. The count in the 3 position counter 922 is subtracted from the number in A recirculation loop. If the distance number on the A recirculation loop is less than 3, a carry signal does not result; if the distance number is greater than 3, a carry signal does result. If there is no carry signal, the control matrix 926 provides a signal to the output drive 928 to activate the slow speed control of the motor that drives the carrier. If a carry signal does result, then the control matrix 926 sends a signal to the output drive 928 to activate the high speed control on the motor driving the carrier.

As the carrier moves, the position detector 930 mounted on the carrier generates an output signal for each position that is moved. The series of pulses generated by the position detector 930 as the carrier moves from position to position is subtracted from the distance number one pulse at a time. Each time a subtraction is performed while the carrier is moving at high speed, another comparison is made with the number stored in the 3 position counter. When the difference number is reduced to 3, a code for switching the motor to slow speed is read out of the B register to the output device under the control of the control matrix. After this time, the 3 position counter 922 is decremented by signals from the position counter.

When the 3 position counter 922 has been counted down to zero by 3 pulses from the position detector 930, it sends a signal to the control matrix 926 which, in turn, pulses the output drive 928 to cause the stop pawl to be released into the rack stopping the carrier.

When the carrier is moving at high speed, the distance number is decreased by 3 in the subtractor and each pulse from the pulse detector 930 is read into the subtractor 912 through the AND gate 932 together with this difference number less 3. The binary one sent from the position detector 930 to the subtractor 912 is subtracted from the distance number. If the original distance number was greater than 3, the decremented distance number minus 3 does not pass through zero and no carry signal results. In the absence of a carry signal, the control matrix opens the AND gate 932 so that the next signal from the position detector is read into the subtractor along with the decremented distance number from the A recirculation loop. The control matrix also reads the distance number from the subtractor 912 into the A recirculation loop 908 by applying a signal to AND gate 920 and then reads the signal back into the subtractor 912 by applying a signal to the AND gate 934 in synchronism with the signal from the position detector 930. This causes binary one's that are being read from the position detector 930 to be subtracted from the distance number until the distance number is equal to 3.

When the distance number is equal to 3, a carry signal is applied to the control matrix 926 at the conclusion of the comparison with the number in the 3 position counter 922 and the difference number from the recirculation loop 908. This happens because the distance number minus 3 passes through zero when it is decremented. Whenever this happens, the control matrix 926 applies a signal to the slow speed control at the output drive 928 and at the same time applies a signal to the AND gate 936 so that the position signals are read from the position detector 930 to the 3 position counter 922, which counter is a bi-directional counter. The 3 position counter 922 is now counted down to its zero position by pulses from the position detector 930. When the 3 position counter 922 reaches zero, it sends a signal to the control matrix 926 which applies a stop signal to the output drive 928. Of course, a software counter could be used for the 3 position counter as well as a hardware counter.

In FIG. 10 a flow diagram is shown illustrating the operations described in connection with FIGS. 8 and 9. In block 1000 the first step is shown after the desired position number has been determined and the program indicates that a tab or a return carriage motion is desirable. It can be seen that a decision is made after the subtraction indicating 3 possible courses of action for the computer and format control to follow: one, if the distance number is zero, a print solenoid remains engaged and there is no motion of the carrier; two, if there is a carry signal and a distance number, the distance number is negative and the control matrix sends a signal to the direction flip-flop to move the carrier to the left; and three, if there is no carry signal but a distance number, the distance number is positive and the control matrix sends a signal to the direction flip-flop to move the carrier to the right.

Block 1002 indicates that another decision must be made whenever there is a distance number greater than zero. This decision determines whether or not the distance number is greater or smaller than 3. This again is indicated by the carry signal from the complementary subtractor when a 3 is subtracted from the distance number as explained in connection with FIG. 9. If there is no carry signal, then the distance number is more than 3 and the high speed control is activated; if there is a carry signal, then the distance number is less than 3 and the low speed signal is activated.

Block 1004 indicates that whenever the carrier is moving at high speed a decision is made each time it moves one position to determine if it is within three positions from its final stopping point. This decision is routed back through the same process indicated by block 1002. Whenever the decision in block 1002 indicates that the distance number is equal to 3 or less than 3, a new programming sequence is followed by the computer. The next decision in this sequence is indicated by block 1006 indicating that a number 1 is subtracted from the distance number each time the carrier moves one position. When the difference number reaches zero, the printing solenoid is engaged and the scanner is stopped. If the difference number is not zero the step indicated in block 1006 is repeated as the carrier moves from position to position.

FIG. 11 is a flow diagram similar to that shown in FIG. 10 but using a notation more familiar to programmers. The symbol 1102 indicates the start of the program. The diamond symbol 1104 indicates that a decision is made as to whether or not the carrier is in its desired position. If it is at its desired position, the program ends as indicated by the symbol 1106; if it is not, the program then goes to a software flip-flop indicated by the symbols within the dotted line box 1107. This software flip-flop is used to sample the output signal from the position detector at two different times. If it detects two successive changes in the signal that it is receiving from the position detector, it counts one position of the carrier.

The software flip-flop shown in the dotted line box 1107 moves from one state to the other continuously looking for such a change in the signal. The signal is first applied through an input channel indicated as 1108 to the decision making unit, which is the subtractor in our embodiment, to determine if it is a binary one signal or not. This decision is indicated at 1110. If no signal has been received, at the next timing pulse the incoming signal is passed through the input channel indicated at 1112 and another comparison with a binary one is made as indicated by the symbol 1114. Again, if no binary one is detected during the decision making step 1114, the input signal is passed through the input channel 1108. This process is repeated until a binary one is detected in the input, at which time the signal is passed through the input channel indicated at 1116 if the decision was made by unit 1110 or to the channel indicated at 1118 if the decision was made by 1114.

A similar process is repeated using the decision steps indicated at 1120 and 1122 until a second change in the input signal is detected. When the second change is detected, a binary one is recorded in an 8 bit software register located in the R circulation loop shown in FIGS. 9 and 10. This step is indicated at 1124 indicating that the distance number minus 3 has been decremented by 1. This distance number $A_{wd}$ is in a working register and is the distance number minus 3.

Each time the distance number minus 3 is decremented by 1, a decision is made at step 1126 as to whether the distance number minus 3 is positive or negative.

If the distance number minus 3 is positive, there is no carry signal output at step 1126 since the number did not pass through zero when it was decremented at step 1124. In this case the program next proceeds to step 1130 in which the output of the high speed flip-flop is tested. Since the carrier is at this time moving at high speed, this flip-flop is in its reset condition so that the program follows the decision route 1132 back to input channel 5 at step 1112 where it continues to count.

Eventually the distance word minus 3 ($A_{wd}$) passes through zero when it is decremented at step 1124, indicating that the carrier is three positions away from a printing position. At this time a carry signal results from the adder so that the program follows the other route from step 1126 to step 1128 where the high speed flip-flop is set. Then the program continues back to input channel 5 at step 1112 where it continues to sample the position signals.

However, since the 8 bit distance word minus 3 has passed through zero it is now 255 so that it does not pass through zero when it is decremented at step 1124. Consequently, the program again proceeds to step 1130 where the high speed flip-flop is tested. However, since the high speed flip-flop was set in step 1128, the program will proceed to step 1134 where a software counter, called the index counter, is tested to determine whether or not it is zero. At this time this register contains the number 3. Since it is not zero, the program follows decision route 1136 to step 1138 where the index register is decremented. The program then returns to input channel 5 at step 1108 where it continues to count.

During the next two counts the program again follows the path from step 1126, to step 1130, to step 1134, to step 1138, and back to step 1108 since all of the steps remain the same. However, after three counts have passed, the number in the index register is zero so that the program follows the alternate route from step 1134 and proceeds to step 1140 where the high speed flip-flop is reset. The carrier is now in its print position and the program restores conditions to normal. To do so, it loads a new program into the processor at step 1142 and stops the carrier at step 1144 by dropping the pawl into the ratchet.

It can be seen that the method and apparatus of this invention provides a flexible and economical technique for controlling the output format of a computer. It enables the format to be controlled from point-to-point, either by an operator or by a stored program. This enables greater flexibility in formats than that provided by systems in which a few tabs may be set at predetermined locations.

Furthermore, the general equipment used by the computer for other purposes can also be used to control the format. This increases the reliability of the format control and reduces its cost since there are fewer hardware flip-flops and counters necessary.

Of course, many modifications and variations are possible in the invention within the scope of the above teachings. It is therefore to be understood that, within the scope of the appended claims, the invention may be practiced otherwise than as specifically described.

What is claimed is:

1. Apparatus for controlling the motion of an article along a predetermined path, comprising:
   drive means for moving said article along said predetermined path;
   switch means for stopping said drive means upon receiving a first signal and for starting said drive means upon receiving a second signal;
   transducer means for generating a third signal each time said article moves a predetermined distance;
   storage means for accumulating and recording said third signals, whereby a record is formed indicating the position of said article with respect to a starting point;
   input means for receiving fourth signals indicating a position to which said article is to be moved; and
   comparator means for comparing said third and fourth signals and for providing said first signal to said switch means whenever said third and fourth signals are equal and for applying said second signal to said switch means whenever said third and fourth signals are unequal.

2. Apparatus for controlling the motion of an article along a predetermined path, comprising:
   drive means for moving said article along said predetermined path;
   switch means for stopping said drive means upon receiving a first signal, for causing said drive means to move in one direction upon receiving a second signal, and for causing said drive means to move in a second direction upon receiving a third signal;
   transducer means for generating a fourth signal each time said article moves a predetermined distance;
   storage means for receiving said fourth signals, for recording a present-position number indicating the position of said article along said path from a predetermined reference point, for adding said fourth signals to said distance number whenever said article is moved in said one direction and for subtracting said fourth signals from said distance number whenever said article is moved in said second direction, whereby said storage means maintains a record indicating the instantaneous position of said article;

input means for receiving a desired-position number indicating a position along said path to which it is desired to move said article; and comparison means for comparing said distance number and said desired-position number and for providing to said switch means said first signal whenever said distance number and said desired-position number are equal, said second signal whenever said distance number is less than said desired-position number, and said third signal whenever said distance number is greater than said desired-position number.

3. Apparatus for controlling the motion of an article along the predetermined path in accordance with claim 2 in which said switch means further comprises speed control means for causing said drive means to move at a slow rate upon receiving a fifth signal, and for causing said drive means to move at a fast rate upon receiving a sixth signal; and in which said comparison means includes a speed control signaling means for providing said fifth signal to said speed control means whenever the difference between said desired-position number and present-position number is less than a predetermined number and for providing said sixth signal whenever the difference between said desired-position number and said present-position number is greater than said predetermined number.

4. Apparatus for generating control signals to activate a moveable marking device at predetermined locations with respect to a document holding device to control the format for indicia placed on said document, comprising:

first means for generating a first signal proportional to the distance between a reference point on said document holding device and the desired position of said marking device at the time of said next activation;

second means for generating a second signal indicative of the displacement between said reference point and said marking device at a predetermined time;

arithmetic means for providing a subtracting operation on said first and said second signals to obtain a third signal representing the difference between said first and said second signals at said predetermined time;

transducer means for generating a fourth signal each time said marking device moves a predetermined distance with respect to said reference-point; and monitoring means for generating said control signals when said third signal has been reduced to a nullity due to the subtraction of said fourth signal from it.

5. Apparatus for generating control signals to activate a marking device at predetermined locations with respect to a document holding device to control the format for indicia placed on said document in accordance with claim 4 further comprising:

said arithmetic means further including an incrementing means for adding said fourth signal to said second signal whenever said marking device moves in a first direction and including a decrementing means for subtracting said fourth signal from said second signal whenever said marking device moves in a second direction; and said monitoring means including generating means for generating a first control signal indicating that said marking device is to be stopped whenever said third signal is zero, for generating a second control signal indicating that said marking device is to be moved in a first direction whenever said third signal is positive, for generating a third control signal indicating that said marking device is to be moved in a second direction whenever said third signal is negative, for generating a fourth control signal indicating that said marking device is to be moved at a high speed whenever said third signal has an absolute value greater than a predetermined number, and for generating a fifth control signal indicating that said marking device is to be moved at a slow speed whenever said third signal has an absolute value less than said predetermined number.

6. Data processing apparatus for controlling the output format of computed data, comprising:

an output means for marking a recording medium with a marking device in which said recording medium is constrained by a holding mechanism;

said marking device having a plurality of positions in which it can mark said recording medium, which positions may be represented by a present-position number indicating their distance from a reference point on said holding mechanism;

transducer means for generating a signal each time said marking device moves from one of said marking positions to an adjacent marking position;

central memory means for recording information;

said central memory means including a first register means for recording the position number indicating the position of said marking device from said reference point;

arithmetic means for performing arithmetic operations;

first arithmetic switching means for adding a one to said present-position number recorded in said first register memory means each time said marking device moves to an adjacent position in one direction and for subtracting a one from said present-position number in said first register means each time said marking device moves in another direction in response to said signals generated by said transducer means only when said marking means moves a plurality of marking positions in succession without marking said recording medium;

first control means for selecting a number stored in said central memory means which number is representative of a desired position in which the next character of said data is to be recorded when said next position is a plurality of marking positions from the present position of said marking device;

second arithmetic switch means for subtracting said number selected by said control means from said number stored in said first register means;

second register means for storing the difference between said number stored by said first register means and the number provided by said first control means;

third arithmetic switch means for adding the number one to the number stored by said first register means whenever said output device marks a character in a marking position adjacent to a marking position in which said marking device has previously marked a character; and output device control means for causing a character of said data to be printed by said output device when the number stored by said second register means becomes zero.

7. Data processing apparatus for controlling the output format of computed data in accordance with claim 6 in which said output device control means comprises:

directional control means for moving said output device in a first direction when the output from said second arithmetic switch means is positive and for moving said output device in a second direction when the output from said second arithmetic switch means is negative; and speed control means for moving said output device at a slow rate when the output from said arithmetic switch means is less than a predetermined amount and for moving said output device at a fast rate when the output from said second arithmetic switch means is above said predetermined amount.

8. Data processing apparatus for controlling the output format of computed data, comprising:

an output means including a marking device to mark a recording medium at a plurality of marking positions, each position represented by a position number indicating the distance from a reference point on said holding mechanism;

a transducer to generate a signal each time said marking device moves from one of said marking positions to an adjacent marking position;

memory means to record information including a first register means to record the position number;

arithmetic means;

first arithmetic switching means responding to said signals generated by said transducer to add a one to said position number each time said marking device moves to an adjacent position in one direction and to subtract a one from said position number each time said marking device moves to an adjacent position in a second direction;

first control means to select a number stored in said memory means representative of a desired position at which the next character of said data is to be recorded;

second arithmetic switch means to subtract said number selected by said first control means from said position number in said first register means;

second register means to store the difference between said position number and the number selected by said first control means; and output control means to cause a character of said data to be printed by said marking device when the number stored by said second register means becomes zero.

9. Data processing apparatus for controlling the output format of computed data in accordance with claim 8 in which said output control means comprises:

directional control means to move said output means in a first direction when the output from said second arithmetic switch means is positive and to move said output means in a second direction when the output from said second arithmetic switch means is negative; and speed control means to move said output means at a slow rate when the output from said second arithmetic switch means is less than a predetermined amount and to move said output means at a fast rate when the output from said second arithmetic switch means is greater than said predetermined amount.

References Cited

UNITED STATES PATENTS

| | | | |
|---|---|---|---|
| 3,324,281 | 6/1967 | Morse | 235—61.6 |
| 3,233,224 | 2/1966 | Foster | 340—172.5 |
| 3,191,006 | 6/1965 | Avakian | 235—61.7 |
| 3,129,321 | 4/1964 | Rogal | 235—61.7 |
| 3,127,504 | 3/1964 | Arnold | 235—61.9 |
| 3,092,810 | 6/1963 | Schmidt | 340—172.5 |
| 3,075,178 | 1/1963 | James | 340—172.5 |
| 3,037,193 | 5/1962 | Barbagallo et al. | 340—172.5 |
| 3,018,956 | 1/1962 | Hosier et al. | 235—157 |
| 3,007,138 | 10/1961 | Honeiser et al. | 340—172.5 |
| 3,000,519 | 9/1961 | Purnell | 214—11 |
| 2,978,685 | 4/1961 | Eckdahl et al. | 340—174.1 |
| 2,974,306 | 3/1961 | Femmer et al. | 340—172.5 |
| 2,954,731 | 10/1960 | Durand et al. | 101—93 |
| 2,885,659 | 5/1959 | Spielbers | 340—174 |

ROBERT C. BAILEY, *Primary Examiner.*

GARETH D. SHAW, *Assistant Examiner.*